US006902794B2

(12) United States Patent
Hirabayashi et al.

(10) Patent No.: US 6,902,794 B2
(45) Date of Patent: Jun. 7, 2005

(54) COATED PAPER FOR PRINTING AND MANUFACTURING METHOD THEREOF

(75) Inventors: Tetsuya Hirabayashi, Yonago (JP); Seiji Fujiwara, Amagasaki (JP); Terunobu Fukui, Nishinomiya (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 10/185,026

(22) Filed: Jun. 28, 2002

(65) Prior Publication Data

US 2002/0182382 A1 Dec. 5, 2002

Related U.S. Application Data

(62) Division of application No. 09/578,059, filed on May 24, 2002, now Pat. No. 6,458,413.

(30) Foreign Application Priority Data

May 29, 1998 (JP) ........................................ H10-149318
May 28, 1999 (JP) ........................................ H11-150755

(51) Int. Cl.[7] ................................................ B32B 23/02
(52) U.S. Cl. .................... 428/195.1; 347/105; 347/102; 428/32.28; 428/503
(58) Field of Search ............................. 428/32.28, 503, 428/195; 347/105, 102

(56) References Cited

U.S. PATENT DOCUMENTS 5,609,964 A * 3/1997 Ogawa et al. .............. 428/520
5,755,929 A * 5/1998 Kuroyama et al. ......... 162/137
6,383,611 B1 * 5/2002 Kohno et al. ............... 428/195

OTHER PUBLICATIONS

McGraw–Hill Dictionary of Scientific and Technical Terms, by McGraw–Hill, Inc., 1974, Phillipines Copyright.
"Testing Method for Smoothness and Air Permeability of Paper and Paperboard by Air Micrometer", J. Tappi Pulp & Papers Testing Method No. 5, 1966, pp. 1–6.

* cited by examiner

*Primary Examiner*—Rena Dye
*Assistant Examiner*—Tamra L. Dicus
(74) *Attorney, Agent, or Firm*—Michael J. Striker

(57) ABSTRACT

A coated paper used for printing and manufacturing method thereof. The coated paper comprises a coated layer mainly compose of a pigment and an adhesive on a base paper or paper web. The coated paper also comprises the thermal shrinkage force (R) which satisfies following formula when measured pursuant to the measuring method described in the specification;

$$0 \leqq R \leqq 45 \text{ gf}$$

A sample coated paper is moisture-adjusted in accordance with JIS-P-8111. Then, it will be cut into specific dimension along with orthogonally to the cross direction. Next, the paper will be put through Thermo Mechanical Analyzer to obtain R that is measured by predetermined technique. The coated paper will be obtained easily by using a base paper coated with PVA having a saponification degree of not less than 85 mol % in an amount of 0.5–5 g/m$^2$ per side surface after the coating material was dried and dried.

5 Claims, 3 Drawing Sheets

COATED PAPER FOR PRINTING AND MANUFACTURING METHOD THEREOF

CROSS-REFERENCE TO A RELATED APPLICATION

This application is a division of U.S. patent application Ser. No. 09/578,059, filed on May 24, 2002 now U.S. Pat. No. 6,458,413 and now allowed.

BACKGROUND OF THE INVENTION

1. Field of the Invention

The present invention relates to a coated paper used in printing and, particularly, to a new coated paper for use in printing which hardly generates any fluting in web-offset printing (in the Japanese printing industry, this may be referred to as "hijiwa") which has been frequently generated during a process of drying after printing in web-offset printing. In addition, it also includes the manufacturing method of the coated paper. This is also very useful when used in rotogravure printing or flexographic printing from the standpoint that it will not cause so much out-of-register, i.e. mis-registration.

2. Description of the Related Art

First of all, an explanation will be given on the fluting in web-offset printing. The trend toward less man-power and higher speed in the printing industry in recent years is changing printing process from sheet-fed (flat sheet) offset printing to offset rotary printing (hereinafter referred to as "web-offset printing"). Not only high-speed printing and simultaneous-double-sided printing but also saving labor in its back-end process can be carried out by the web-offset printing. The productivity of the web-offset printing is significantly higher than that of the sheet-fed (flat sheet) offset printing in view of, such as, labor saving of its following process.

However, since a hot air drying process is conducted immediately after its printing process in case of web-offset printing, there are several quality defects that are not produced in sheet-fed offset printing. Among them, a problem that is known as most significant and difficult to solve is fluting in web-offset printing. Hitherto, the fluting in web-offset printing has been considered as a problem peculiar to web-offset printing, and is a phenomenon in which stripe-shaped wrinkles have been generated along the machine direction of the paper after a Web-offset printing operation is applied, which is apt to occur in a coated paper that is required good printing finish. In a worse case, the printed material would become waved, like a waved galvanized sheet iron, so that its substantial commercial value will be greatly lowered. Thus, a coated paper for printing which will not generate such fluting or wrinkles in web-offset printing has been strongly demanded for a long time. However, such a paper has not been provided to the market as or yet.

Now, several study reports have been issued on the aforementioned fluting in web-offset printing and they maybe roughly classified into the following two types:

One is based on the thought of "tension wrinkles." In this theory, it is considered that fluting in web-offset printing is formed by wrinkles which is initially generated by the tension added to the paper in web-offset printing and is then fixed by offset ink.

As to the other, it is considered that wrinkles are generated by the difference in the thermal shrinkage between the imaged area and the non-imaged area during the drying process in the web-offset printing operation (Takeshi Yamazaki/Pulp and Paper Research Conference Proceedings of JAPAN TAPPI: Vol. 49, P110–113/1982.)

One of the methods proposed as concrete means to suppress such a phenomenon as disclosed in publication of Japanese unexamined patent application No. 186700/1983. In this method, such fluting in web-offset printing is considered to be prevented by keeping the freeness of pulp used in a paper web within a specific scope and by controlling the air permeability simultaneously within a specific scope.

However, at the time of manufacturing coated paper for use in web-offset printing, since the products are made through a series of processes such as the preparation of paper stock, paper-making, coating, press finishing with a calender and winding, it is not possible to obtain products in satisfactory quality merely by adjusting the pulp freeness or air permeability of the base paper. Any product that avoids the fluting in web-offset printing has not been made as of yet.

Further, according to publication of unexamined Japanese patent application No. 291496/1997, it is proposed that the fluting in web-offset printing can be either solved or alleviated by specifying the web moisture and the internal bond strength of a base paper. However, if the internal bond strength is lowered, this will require lowering of the moisture of a coated paper in view of countermeasure for blister resistance, which is considered as another problem of the coated paper for web-offset printing. As a result, there is a fear of causing a problem so called "fold-cracking trouble" which is a phenomenon that the surface of the coated paper for web-off set-printing is cracked in a subsequent bending process. Any improvement effect on solving the fluting in web-offset printing has not been made satisfactorily in accordance with the conventional method.

We, the inventors of the present invention, have sought for the factor generating the fluting in web-offset printing which is an important problem in quality and to be solved with regard to the coated paper for web-offset printing as mentioned above. And we have repeated careful studies so as to solve the problem. Consequently, we created the present invention, in which the fluting in web-offset printing can be prevented in advance by using a paper having small thermal shrinkage force in the cross direction (the CD direction).

Namely, since the fluting in web-offset printing has been generated mainly in coated paper having low basis weight (about the basis weight of 60 g/m$^2$ and below), the countermeasures therefor are intended for such coated paper having low basis weight. However, since the fluting in web-offset printing is also seen in coated papers having rather high basis weight of greater than 60 g/m$^2$ through the observation of the inventors, they have taken these facts into consideration and endeavored to obtain original coated paper that would not generate the fluting in web-offset printing.

Needless to say, the coated paper according to the invention will show significant effects in solving the fluting in web-offset printing, and besides "the mis-registration" which is easily caused by thermal drying can be effectively suppressed if it is utilized as paper for printing used in printing machines equipped with drying units, such as gravure printing machines and flexographic printing machines.

SUMMARY OF THE INVENTION

According to the invention, a coated paper for printing is provided with a coated layer mainly composed of a pigment and an adhesive on a base paper (which includes a paper web before preliminary treatment). The coated paper for printing is characterized in that the thermal shrinkage force R in the cross direction (CD direction) of the said coated paper satisfies the formula (1) when measured pursuant to the measuring method specified below.

$$0 \leqq R \leqq 45 \text{ gf} \quad (1)$$

[Measuring Method of Thermal Shrinkage Force R]

A sample coated paper of which moisture is previously adjusted pursuant to JIS P8111 (the moisture adjustment is made while the room temperature is 20° C., with a relative humidity of 65%) is cut if to obtain a span of 2 mm width being fed into the machine with a length of 2 cm in the cross direction. Then, thus obtained coated paper is set to a Thermo Mechanical Analyzer [TMA/SS6000: manufactured by Seiko Electronics Industries Co., Ltd.]. As PID Control Values of the terminal probe at the analyzer, P (Proportion)=100, I (Integration)=1, D (Differential)=100 are used. The shrinkage force "R" is obtained by the steps of expanding the span at the rate of 0.01 μm/minute under the condition that the initial load of 5 gf is added, raising the temperature from 20° C. at a heating speed of 200° C./minute to a predetermined temperature of 300° C., maintained at the predetermined temperature of 300° C. for 2 minutes, then reading the shrinkage force generated by thermal drying at 1.5 minutes after the commencement of the rise in temperature.

Namely, TMA/SS is abbreviation for [Thermo Mechanical Analyzer/Stress Strain] and indicates a type of measuring device for thermal physical properties.

The subject of the present invention is a coated paper for printing comprising a coated layer mainly composed of a pigment and an adhesive on base paper or paper web in which the coated paper for printing comprises an air resistance (air resistance) of 80,000 seconds or higher when measured pursuant to J. TAPPI Pulp & Paper Testing Method No. 5 (B).

Moreover, as one of preferred embodiments of the coated paper for printing according to the present invention which satisfies R in the above described formula (1) and air permeability (air resistance), a base paper which is obtained by coating a paper web on both sides with an aqueous solution of polyvinyl alcohol thereinafter referred to as PVA) or aqueous liquid composed of polyvinyl alcohol and inorganic pigment in an amount of 0.5–5 g/m$^2$ per side surface after being dried may be used.

Further, as another preferred embodiment of the present invention, abase paper which is obtained by application of an aqueous solution of polyvinyl alcohol or aqueous liquid composed of polyvinyl alcohol and inorganic pigment and having air resistance of 1,000 seconds or higher when measured pursuant to JIS-P-8117 (1998; Gurley method), in which the above mentioned PVA will have a saponification degree of not less than 85 mol % can be used.

Furthermore, in the above-mentioned coated paper for printing which has a coated layer mainly composed of pigments and adhesives on the base paper coated with an aqueous solution of PVA or aqueous liquid composed of PVA and inorganic pigment and dried since the paper surface is covered with above-described coated layer, the air resistance will become much higher in comparison with that of the base paper so that it is no longer possible to measure it by the measuring method pursuant to JIS-P-8117. Thus, the air permeability (air resistance) will be measured in accordance with J. TAPPI Pulp and Paper Testing Method No. 5 (B).

In this invention, the technical reason for using the aforementioned PVA is to heighten the air resistance of the paper by forming a kind of resin film on the surface of the paper by the said PVA. Thereby, it aims at preventing the wrinkles generated by the difference in the amount of shrinkage between in the imaged area and in the non-imaged area during the drying process in the web-offset printing operation. In other words, the inventors found that shrinkage caused by evaporation of moisture in the paper during drying process can be prevented beforehand. Thus, the resin film which will be applied in order to prevent the evaporation of the aforemenitioned moisture can be formed by using something other than the aforementioned PVA. For example, various SBR latex and synthetic resins such as polyester resins can also be used.

Since the terms "a paper web" and "a base paper" are distinguished and used to explain the present invention in this specification, a supplementary explanation will be added herein after. The terms "a paper web" and "a base paper" are both used to indicate an initial material sheet then used to obtain a coated paper of the present invention, which is the end product. More specifically, a paper sheet before the application of the finish coating is referred to as "a base paper" and it generally means a sheet having predetermined air resistance by means of a pre-forming resin film of, for example, PVA on the surface of a material sheet. Or the other hand, "a paper web" indicates a material sheet to be used to obtain the above-mentioned base paper. More particularly, indicates a paper sheet before being applied pre-treatment process that comprises a manufacturing method of a coated paper according to the present invention. That is to say, a paper sheet prior to having been treated with the process of forming-a resin film such as PVA, which is a component of the present invention, is referred to as "a paper web".

In other words, "a base paper" is a paper sheet after having been coated with a resin liquid of, for example, PVA, and is a sheet before having been coated with a final finish coat. Namely, in the conventional method described hereinbefore, only the term "a base paper" is inclusively used and does not represent any distinguished meaning.

Incidentally, we, the inventors of this invention, have earnestly repeated our studies on the mechanism of generation of the fluting in web-offset printing which has been conventionally considered as a problem and also on the measures to solve this problem. As a result, we finally obtained the following knowledge on the generating mechanism of the fluting in web-offset printing.

First of all, if we observe the basic characteristics of fluting in web-offset printing, it may be considered to be a state that the printing material, which should be flat in its nature, has been folded several times over in the transverse direction. This may be considered that fluting in web-offset printing is the same as a phenomenon that an object has been buckled after it has been given compressive force in the transverse direction. Thus, its behavior may be defined by using equation (2) derived from the Euler's formula.

$$P=(n^2\pi^2bh^3)Ec/12L^2 \quad (2),$$

where

P: Stress to buckle the imaged area.

n: Number of buckling in the imaged area.

Ec: Modulus of elasticity of the imaged area in the transverse direction.

b: Length of the imaged area.

h: Thickness of the imaged area.

L: Width of the imaged area.

The right side of the equation (2) represents the factor which resists the force to buckle the paper, and it is considered as buckling resistance force.

In this regard, in order to make the right of the equation (2) more easily understood, we applied Gurley stiffness (S) to the right side of this equation. This Gurley stiffness is commonly used in to explain the characteristics of paper. Now, the Gurley stiffness (S) is defined as the equation (3) shown below:

$$S=kh^3Ec \text{ (Derived from the definition of Gurley stiffness)} \quad (3),$$

where
S: Gurley stiffness
Ec: Modulus of elasticity of the paper
h: Thickness of the paper
k: Constant Substituting the equation (3) into the equation (2), we can now obtain equation (4), which represents the number of fluting N. The number of fluting N is ½ of the number of buckling n in the imaged area.

$$N=kL(P/bS)^{1/2} \quad (4),$$

where
N: Number of fluting
k: Constant
L: Width of the imaged area
P: Compressive force in the transverse direction
b: Length of the imaged area
S: Gurley stiffness of the imaged area Now, we would like to explain what the imaged area and the non-imaged area means, i.e. the imaged area means the portion where the ink has been transferred in web-offset printing, and the non-imaged area means the portion where the ink has not been transferred.

By the way, when the width (L) of the aforementioned imaged area is specified, the number of the fluting in web-offset printing is determined by three factors, namely, the compressive force (P) in the transverse direction, the length (b) of the imaged area, and the Gurley stiffness (S) of the imaged area. If the compressive force in the transverse direction increases, the fluting in web-offset printing will increase proportionally to the square root of such compressive force. On the contrary, if either the length of the imaged area becomes longer or the Gurley stiffness of the imaged area becomes larger, the fluting in web-offset printing will decrease in reverse proportion to their respective square root.

The compressive force (P) in the transverse direction which buckles a paper may be classified into two forces such as the Poisson's force which is generated by the tension and the shrinkage force which comes from the difference in the amount of shrinkage between the imaged area and the non-imaged area during the drying process.

With regard to the Poisson's force, if an object is stretched in the longitudinal direction, there is a property in which the object tends to shrink in the cross direction. In this regard, if we express the expansion in the longitudinal direction by $\epsilon m$, and the contraction in the cross direction by $\epsilon c$, respectively, the ratio $\upsilon=\epsilon c/\epsilon m$ has a value proper to the object, which is called Poisson's ratio.

If the paper had an infinite length, even if it were pulled in the longitudinal direction, the paper would merely bring the shrinkage in the lateral direction in accordance with its Poisson's Ratio. Of course, it does not mean, however, that the paper is able to shrink freely since both ends of the paper are actually fixed at a limited interval in a flowing direction of the machine. In addition, because the tension is subject to change, the compressive force will be generated in the lateral direction, which results in buckling of the paper. This is the mechanism in which wrinkles are generated by the Poisson's force.

As for the other lateral compressive force, it may be considered that the shrinkage force during the drying process is affecting thereto. In other words, in the web-offset printing operation, the paper shrinks during the drying process after the printing operation. In this instance, the shrinkage begins from the beginning of the drying process in the non-imaged area. On the contrary, the shrinkage will begin later in the imaged area in comparison with in the non-imaged area because the imaged area has been masked by the ink layer which prevents the moisture contained in this area from being evaporated. Consequently, the shrinkage of the non-imaged area will affect the imaged area with a compressive force so as to form buckling in the imaged area.

It is thus concluded that the aforementioned fluting in web-offset printing is the buckling formed in the imaged area by the two forces as described above. When an object is buckled, it will form such a shape that the object is folded at only one point where the least stress is required. However, the fact that the paper receives the tension in the longitudinal direction during the web-offset printing means that the reaction will work on the paper to sustain an even surface. This is the reason why the fluting in web-offset printing forms small peaks generating a waved galvanized sheet iron.

We, the inventors of this invention, conducted research and studies on compressive forces in the lateral direction that forms the fluting in web-offset printing in connection with all kinds of coated paper. As a result, it was found that the lateral compressive force generated by thermal shrinkage force was larger than the lateral compressive force generated by the Poisson's force. In addition, it was also found that it greatly varied in accordance with the changes of orientation of fiber or types of size presses, which led to the fact that the compressive force in the lateral direction which generates the fluting in the web-offset printing depended upon the thermal shrinkage force. Thus, as a result of studies made on the measurement of the thermal shrinkage force, we finally came to realize what was required primarily: the compressive stress which acts on the imaged area which shrinks simultaneously with the non-imaged area. However, regretfully, at present there is no means to measure such a stress completely.

On the other hand, as a result of the repeated studies, we found that the thermal shrinkage force measured by the following method had a close correlation with the generation of the fluting in web-offset printing so that it could be used sufficiently as an index, i.e. as a substitute value, of the compressive force in the lateral direction which forms the fluting in web-offset printing.

Thus, the measuring method of thermal shrinkage force R of this invention may be specified as follows:

In other words, sampling coated paper which has been prepared with moisture control [under conditions of the room temperature of 20° C. and the relative humidity (RH) of 65%] when measured-pursuant to JIS-P-8111 is cut off to obtain a span of 2 mm wide in the machine direction with a length of 2 cm in the cross direction (i.e. a direction that is perpendicular to the machine direction). Then, attach it to Thermo Mechanical Analyzer [TMA/SS6000: Seiko Electronics Industries Co., Ltd.] within initial load of 5 gf. In this instance, in order to control the span changes caused from shrinkage of the sample papers, P=100, I=1, and D=100 are used as a PID control value of the probe in the TMA apparatus. In addition, the span shall be set up so as to be expanded at the rate of 0.01 μm/minute while being measured in view of the program for the TMA apparatus which will require minimum change of the span. It is, however, believed that the span is substantially almost fixed.

To pursue the relation between the thermal shrinkage force of the paper samples and the fluting in web-offset printing, the temperature will be raised from 20° C. at a rising speed of 200° C./minute, up to the set temperature of 300° C., and maintain that state for 2 minutes so that the shrinkage force is measured 1.5 minutes after the temperature starts to rise. We found that the relation of the generation of the fluting in web-offset printing arid the shrinkage force caused from thermal drying is obtained with good reproducibility if such conditions have been set.

By the way, as shown in the above equation (4), except for the factor of the printed figure, the fluting in web-offset printing will be determined by the compressive force (P) in the cross direction and the Gurley stiffness (S) so that it may be considered that it is required to specify both the thermal shrinkage force (R) which will be the substitute value of the compressive force (P) in the cross direction of a coated paper and the Gurley stiffness (S) to solve the fluting in web-offset printing. As well known, the Gurley stiffness (S) is physical property value that will be greatly influenced by elastic modulus of a paper and thickness of a paper, in which the thickness of a paper has great influence on it, in the meantime the thickness of a paper is greatly influenced by the basis weight of the coated paper. However, we dare describe this invention without referring to the Gurley stiffness (S) and basis weight in the specification of the invention.

This is because when the users, i.e. the printers, select papers for printing between the high basis weight and the low basis weight, the range of tolerance to the fluting in web-offset printing will vary according to their selection. For example, if they adopt the papers of high basis weight, they will be careful to not allow even the slightest fluting in web-offset printing. On the other hand, if they adopt the papers of low basis weight, a large number of the wrinkles in web-offset printing will generally appear so that even a slight decrease of the fluting in web-offset printing will be evaluated as a sufficient improvement effect. That is, allowable range of the number of the fluting in web-offset printing, i.e. (N) in the above equation (4), will industrially vary according to the basis weight of a coated paper.

In consideration of the above mentioned circumstances, we neither refer to the Gurley stiffness of a coated paper which is another influence factor to the wrinkles in web-offset printing nor to the basis weight of a coated paper which will have extremely great influence on the Gurley stiffness. That is, the inventors ardently repeated the study as to the factor which may be related to the occurrence of the fluting in web-offset printing other than the Gurley stiffness or the basis weigh, and as a result, we, the inventors, finally found the fact that a thermal shrinkage force of paper has great influence on it. In other words, we found that the fluting in web-offset printing was alleviated quite effectively when the thermal shrinkage force (R) of the coated paper measured under a certain condition satisfied the specified value as mentioned above, which means that the commercial value of the coated paper for printing will be greatly improved. Thus we have finally completed this invention.

In addition, the reason why the thermal shrinkage force (R) in formula (1) is specified at 45 gf or below, is that if (R) exceeds 45 gf, the compressive force in the cross direction during the drying process after the printing operation will become large, which makes the fluting in web-offset printing worse and the commercial value of the products will be reduced.

Furthermore, it is necessary that R is a positive value. The reason is that if R were a negative value, in other words, if such a phenomenon to elongate occurs, the compression force would affect rather the non-imaged area than the imaged area, which would result in the buckling in the non-imaged area leading to the fluting in web-offset printing. However, as long as an ordinary coated paper for printing is used, (R) seldom takes a negative value. Accordingly, (R) can be expressed by $0 \leqq R \leqq 45$ gf, and more preferably, it will be specified at 40 gf or below.

Zero, that is a level where absolutely no thermal shrinkage occurs, would he most desirable as to the lower limit. However, considering the fact that the product is mainly composed of natural fibers which contain moisture, it usually accompanies some thermal shrinkage by its nature.

The coated paper for printing according to the present invention comprises a coated layer mainly composed of a pigment and an adhesive on a base paper or paper web in which the basis weight is usually not less than 35 g/$m^2$. In addition, it is known that the fluting in web-offset printing and the mis-registration, which the present invention aims to solve, are apt to occur at the basis weight of 130 g/$m^2$ or lower. When the present invention is used, it is preferable that it will be applied to a paper having a basis weight of 35–130 g/$m^2$. More particularly, a paper having a basis weight of 60–130 g/$m^2$ will bring about even a better result.

By the way, since there are various adjustment methods of the thermal shrinkage force (R), it is possible to adopt a method arbitrarily, without being specifically limited. For example, the thermal shrinkage force (R) can be adjusted by suitably changing the beating condition of the pulp, types of chemicals for the size press, coating amount, conditions for the paper making, orientation of the fiber, types of pigments in the coated layer, types of binders, compounding ratio of binder and pigment and its coating amount or drying conditions at the coating process.

Furthermore, when considering the characteristics of a coated paper that will reduce the wrinkles in web-offset printing and/or the mis-registration that may be generated during the roto gravure printing or flexographic printing, if the coated paper has an extremely high air resistance (=poor permeance), we found that they can be effectively improved if the coated paper is finished to have an air resistance of not less than 80,000 seconds when measured pursuant to J. TAPPI Pulp and Paper Testing Method No. 5 (B). The reason for this is that the air resistance of the coated paper is so high that the moisture of the base paper will not be dispersed by the heat so that the thermal shrinkage of the coated paper will not occur easily. In other words, it is considered that since the thermal shrinkage is kept at a low level, the fluting in web-offset printing will not be generated, which prevents the occurrence of the mis-registration as well. Namely, it can not improve the wrinkles in web-offset printing or the mis-registration so satisfactorily if the coated paper has an air resistance of not greater than 80,000 seconds when measured pursuant to J. TAPPI Pulp and Paper Testing Method No. 5 (B).

The upper limit of the air resistance is not defined particularly though, lower than 3,000,000 seconds will be preferred in view of the balance with the blister resistance aptitude of the web-offset printing. However, the air resistance level of 3,000,000 seconds is out of the measuring range of the aptitude by the measuring method of the air resistance so that the measured value will include a certain fluctuation. Further, if the coated paper satisfies both values of the thermal shrinkage force (R) and air resistance defined in the present invention, it will be particularly preferred since such coated paper will effectively improve the fluting in web-offset printing or the mis-registration.

Moreover, as a result of our repeated study relating to the method to obtain a coated paper having particular thermal shrinkage force (R) and air resistance, it was found that it is preferred to use a base paper that will be obtained by applying an aqueous solution mainly composed of PVA to a paper web and drying under appropriate conditions. A base paper resulting in such coated paper for printing will be obtained by using a paper web coated on both sides with an aqueous solution of polyvinyl alcohol in an amount of 0.5–5 $g/m^2$ per side surface after being dried; then, forming a coated layer mainly composed of pigments and adhesive thereon. Here, the aqueous solution of polyvinyl alcohol means an aqueous solution which is mainly composed of gelatinized PVA. Not only various auxiliaries such as anti-foaming agent, antiseptic but also a water soluble resin such as starch, starch derivative, cellulose derivative and an aqueous dispersive resin such as styrene-butadiene copolymer latex can be added 50 parts or less per 100 parts of PVA (in terms of solid matter) to the aqueous solution of polyvinyl alcohol.

When applying such aqueous solution of PVA to a paper web, it is confirmed that a good PVA film can be formed on the paper web if it is applied with high viscosity so long as there is no problem in view of handling and operation and it is dried as fast as possible. When a coated paper for printing is made by use of thus obtained base paper, it can efficiently improve the fluting, in web-offset printing and mis-registration. Namely, it is preferred to adjust the viscosity of the aqueous solution of PVA in the range of 100–2000 mPa·s with Brookfield viscosity of 60 rpm (i.e. Brookfield viscosity is measured by revolving No. 3 spindle at 60 rpm) at temperature of aqueous solution of 20° C. when it is applied to the paper web. When the viscosity of the aqueous solution of PVA is lower than 100 mPa·s, the PVA being applied is penetrated into inside of the paper web so that it is difficult to form a PVA film on the surface of the paper web. On the contrary, when the viscosity exceeds 200 mPa·s, the coating aptitude of the aqueous solution of PVA deteriorates so that it becomes difficult to coat uniformly on the paper web.

When the aqueous solution of PVA is applied to the paper web, coating equipment is not limited in particular. However, for example, a two roll size press coater, a gate roll coater, a bar coater, a roll coater, a blade coater, a film metering size press coater will be suitably used. Among them, in order to apply compositions having high viscosity, such as a gate roll coater, a film metering size press coater will be favorably used.

In this invention, it is preferred to use a base paper which is obtained by coating a paper web on both sides with an aqueous liquid composed of polyvinyl alcohol and inorganic pigment in an amount of 0.5–5 $g/m^2$ per side surface after dried and then drying it since when thus obtained base paper is finished as the coated paper for printing, not only the fluting in web-offset printing and mis-registration will be solved or reduced but also the printing finish, printability and runnability for the coating process will be improved. In this instance, there is no special limitation as to the inorganic pigments to be used though, pigments such as clay, kaolin, talc, calcium carbonate, and aluminum hydroxide are given as examples.

As to the amount of inorganic pigments to be added to the aqueous solution of PVA, 300 parts or less, preferably in the range of 50–200 parts per 100 parts of PVA in terms of solid matter will be prepared. Namely, if more than 300 parts of inorganic pigments are added, it is liable not to obtain significant improvement effect on the fluting in web-offset printing or on mis-registration, which is desired by this invention.

When the aqueous liquid of PVA and inorganic pigments is applied to the paper web, the afore-mentioned coating machines that will be used for the application of the aqueous solution of PVA can be used.

It is preferred to coat the paper web with the aqueous liquid being composed of PVA aqueous solution and inorganic pigments and having viscosity in the range of 100–2000 mPa·s with Brookfield viscosity of 60 rpm at temperature of aqueous liquid of 20° C. The reason thereof is already described above and it will be desired to maintain the viscosity in the above-mentioned range.

In addition, the amount of the aqueous liquid of PVA aqueous solution and inorganic pigments to be applied will be preferably 0.5–5 $g/m^2$ by weight per side surface after being dried. When coating is made, it is preferable to make such coating on both surfaces approximately equal. Namely, if the coating amount on both surfaces is less than 1 $g/m^2$, it is difficult to obtain such effects that will solve or alleviate the fluting in web-offset printing desired by this invention. On the other hand, if the coating amount on one surface exceeds 5 $g/m^2$, the effect will be saturated. When the coating amount exceeds it, various problems will occur on runnability or printability, which is not desirable. The application of the aqueous solution of PVA or aqueous liquid composed of PVA and inorganic pigments to the paper web will be made separately to form multi layers.

The characteristics of the base paper that will be obtained by the application of the PVA aqueous solution or the aqueous liquid composed of PVA and inorganic pigments to the paper web and the following drying process is that it has the air resistance of 1,000 seconds or higher when measured pursuant to JIS-P-8117, preferably 1,500 seconds or higher. When a coated paper for printing is obtained by forming a coated layer mainly composed of a pigment and an adhesive on this base paper, the fluting in web-offset printing and the mis-registration will be significantly solved or reduced. Namely, if a base paper having the air resistance of less than 1,000 seconds is used to obtain the coated paper with the coated layer mainly composed of the pigment and the adhesive, it will be difficult to adjust the thermal shrinkage force (R) in the range of the present invention. It will be also difficult to adjust the air permeability (air resistance) in the range specified by the present invention when measured pursuant to J. TAPPI Pulp and Paper Testing Method No. 5 (B) so that it is liable not to obtain significant improvement effect on the fluting in web-offset printing or on mis-registration.

The PVA having the saponification degree of not less than 85 mol %, preferably not less than 90 mol % will be used as a preferred embodiment since significant improvement effect on the fluting in web-offset printing or on mis-registration will be obtained.

Moreover, why the base paper obtained by the application in the specified amount of the PVA aqueous solution or the aqueous liquid composed of PVA and inorganic pigments to the paper web, besides having PVA with high saponification degree is selectively used in this invention is that once such PVA is applied to the paper web and dried to be a film state, even if it comes into contact with water, will not dissolve easily. The film state will be maintained as it is. Although the reason for this is not entirely clarified, we presume as follows: that is to say, the base paper to which the said PVA is applied, will be finished as a coated paper by further application of aqueous pigment compositions in the following process. During the process, the PVA film will come into contact with a lot of water. In this case, if the PVA film has a strong waterproof property, the film-state will be sustained and will be finished as the coated paper. If such a coated paper is used in web-offset printing, during the printing process with high temperature drying treatment, the moisture contained in the coated paper will evaporate by the high temperature. In accordance with this, the coated paper begins to shrink. On the other hand, once heated, since the PVA film formed on the paper web has the property of spreading, which is opposite to the property of shrinking, the both will compensate each other so that the thermal shrinkage of the coated paper is suppressed as a whole. As a result, the thermal shrinkage force of the coated paper caused from the heat will be decreased, and accordingly, the fluting in web-offset printing will be alleviated.

Consequently, when the PVA aqueous solution or the aqueous liquid of PVA solution and inorganic pigments is applied to the paper web and dried, it is important that the PVA coat (film) is formed on the surface of the paper web. Whether or not the PVA coat is formed can he judged by measuring the air resistance of the base or coated paper. By its very nature, if the coat formation is weak, the air resistance comes to low (=good permeance), and if the coat formation is strong, the air resistance comes to high (=poor permeance). Thus, judgement can be made easily.

As above described, the coat of PVA on the paper web surface is influenced by the viscosity of the coating liquid. Thus, it is preferred to use the PVA having polymerization degree in the range of 100–3,000 to obtain a good coat. Various denaturation PVA can be used as long as it has good coat forming aptitude.

It is conventionally known that PVA is applied to the surface of a paper web (one example is described in publication of unexamined Japanese patent application No. 62294/1980), for the purpose of adding blister resistance to the paper web of the coated paper for web-offset printing. In this reference an attempt was made to manufacture a coated paper for the web-offset printing by adding surface-active agent to the PVA before having coated the paper web. In other words, it aims to improve the blister resistance that is one of the problems to be solved for the coated paper used in the web-offset printing. The summary of the said reference is to let the PVA penetrate into inside of the paper web layer by using it in combination with the surface active agent to strength the internal bond of the paper web while the formation of the PVA coat on the paper web surface will be restrained (i.e. the air permeance is accelerated by lowering the air resistance) so as to improve the blister resistance property. Consequently, the technical philosophy thereof is completely opposite from that of the present invention.

Now, a reference will be made to another publication of unexamined Japanese patent application No. 11314/1979. It discloses a base paper having an excellent blister resistance by applying PVA to the paper web so as to make the Z axis strength thereof higher than a certain level in the meantime the air resistance is kept lower than a certain value. Namely, according to this reference, the air resistance of the base paper is 100 seconds or below. Since the blister will be generated by the air resistance of several hundred seconds, the base paper according to this reference is obviously different from that, which exceeds 1,000 seconds, defined in the invention.

In short, both of the aforementioned references intend to improve the blister resistance in the web-offset printing by applying PVA to the paper web in order to heighten the internal bond strength and also in order to lower the air resistance as much as possible. On the other hand, in this invention, the air resistance is heightened by coating the paper web surface with PVA and forming a PVA film on the surface, in other words, a resin film composed of, such as, PVA will be formed on the surface of the paper web to obtain the air resistance of high degree, thereby the fluting in web-offset printing, that can not be solved by the prior arts, will be removed significantly so that it will be considered that the present invention is based on novel and distinguished technical concept which has not been existed conventionally.

Next, a reference is made to the constitution of the pulp that composes the paper web used to make the coated paper for the web-offset printing of the present invention. According to the present invention, there are no particular limitations on pulp to be used. For example, bleached hardwood raft pulp (LBKP), bleached soft wood kraft pulp (NBKP), high yield pulp, and deinked used paper pulp will be suitably selected and used. In addition to this, there are no particular limitations on the paper making method for a paper web so that either the acidic or alkaline method may be adopted to make the paper web. It is possible to pre-coat the paper web by using an ordinary coater such as two-roll size press coater, roll coater and blade coater.

In this invention, there are no specific limitations on the aqueous pigment coating composition, which mainly contains pigments and adhesives, to be applied to the base paper or paper web. However, one or more usual pigments for coated paper, such as clay, kaolin, aluminum hydroxide, calcium carbonate, titanium dioxide, barium sulfate, zinc oxide, satin white, calcium sulfate, talc and plastic pigment can be suitably selected and used.

Furthermore, according to the present invention, the adhesives, for example, a conjugate diene-based copolymer latex such as styrene-butadiene copolymer and methyl methacrylate-butadiene copolymer, an acrylic polymer latex such as a polymer or copolymer of acrylic acid ester and/or methacrylic acid ester, a vinyl based polymer latex like ethylene-acetic acid vinyl copolymer, and an alkali soluble or alkali non-soluble polymer and copolymer latexes made by denaturing the above-mentioned various copolymers with a functional-group containing monomer such as a carboxyl group, can be suitably selected and used. In addition to the above, the following adhesives may be used; starches such as cationized starch, oxidized starch, thermochemically modified starch, denatured enzyme starch, etherified starch, esterified starch, cold water soluble starch, celluloses such as carboxylmethyl cellulose, hydroxy methyl cellulose, and a water-soluble synthetic resin based adhesives such as polyvinyl alcohol, olefin-maleic anhydride resin, can be suitably selected and used.

Further, various additives such as dispersant, water resisting agent, rheology modifier, coloring agent and fluorescent whitening agent will be added to the aqueous pigment coating composition if necessary.

When the aqueous coating pigment composition is applied to the base paper or paper web, it will be applied to form a single or multi-layers by the on- or off-machine coaters used in usual coated paper manufacture, such as blade coater, air knife coater, roll coater, reverse roll coater, bar coater, curtain coater, die slot coater, gravure coater, champflex coater and size press coater. The solid content of the aqueous pigment coating composition to be applied will be prepared generally in the range of 40–75 weight % though, a range of 45–70 weight % will be desirable considering the runnability. The amount of the application will be preferably adjusted in the range of 5–20 g/m$^2$ per side surface in dry weight in general.

The coated paper for printing thus obtained is usually passed through calender rolls and wound up to finish as the product. With regard to the calenders, various types of calenders composed of metal rolls or metal drums and elastic rolls, for example, super calender, gloss calender, soft compact calender, etc., are properly used in the specification of on- or off-machine.

BRIEF DESCRIPTION OF THE DRAWINGS

The attached drawings illustrate the irregularity of the surface of the imaged area of the coated paper after printing by using the visible light laser type displacement sensor (LB-1000/Keyence Corporation) so as to measure the displacement of the above mentioned flutings in web-offset printing, and by using the waveform data observation software (WAVE SHOT/Keyence Corporation) to make it into graphs. It concretely shows that the more the surface is irregular, the worse the fluting in web-offset printing is.

DESCRIPTION OF PREFERRED EMBODIMENTS

Figure 1:
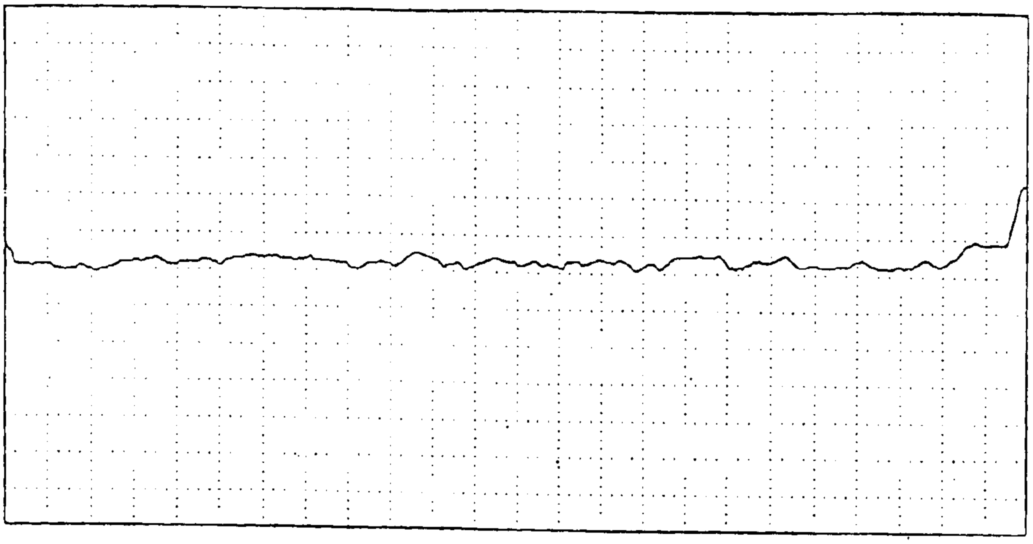
FIG. 1 is a graph of the fluting in web-offset printing of the coated paper which corresponds to the example 1 of the present invention. A scale expresses 200 μm in the longitudinal direction and 6.9 mm in the lateral direction, respectively, in the graphs inclusive following ones.

The present invention will be described more in detail in conjunction with a set of examples and comparative examples. However, it is understood that the present invention is not limited thereto. The term “part(s)” and “%” in the description mean “part(s) by weight” and “% by weight” unless otherwise specified.

In addition, the method of evaluation of the thermal shrinkage force (R) is shown as follows:

[Measuring Method of Thermal Shrinkage Force R]

A sample coated paper whose moisture is previously adjusted pursuant to JIS-P-8111 (moisture adjustment is made under the condition of room temperature of 20° C., relative humidity of 65%) is cut off to obtain a span of 2 mm wide in the machine direction with a length of 2 cm in the cross direction. Then, thus obtained coated paper is set to a Thermo Mechanical Analyzer [TMA/SS6000: manufactured by Seiko Electronics Industries Co., Ltd.] under the initial load of 5 gf. As the PID control value of the terminal probe at the analyzer, P (Proportion)=100, I (Integration)=1, D (Differential)=100 are used. The shrinkage force “R” is obtained by the steps of expanding the span at the rate of 0.01 μm/minute under the condition that the initial load of 5 gf is added, rising the temperature from 20° C. at a heating speed of 200° C./minute to the predetermined temperature of 300° C., maintained at the temperature of 300° C. for 2 minutes, then reading the shrinkage force generated by drying of 1.5 minutes after the commencement of the rise of the temperature.

[Evaluation of the Fluting in Web-offset Printing]

A figure with four colors solid was printed on both sides by using the web-offset printing machine manufactured by Komori Printing Machine Co., Ltd. Then, the fluting in web-offset printing generated thereby was visually evaluated. The moisture of the coated papers used is fixed in the range of 4.5–5.0%, at the print speed of 200 rpm and the paper surface temperature of 110° C. at the exit of the dryer.

EXAMPLE 1

To a pulp slurry consisting of LBKP 70 parts (freeness 410 ml/csf) and NBKP 30 parts (freeness 480 ml/csf), precipitated calcium carbonate was added as a filler to obtain the paper ash of 10. Then, as a sizing agent to the pulp slurry, 0.04 parts of AKD sizing agent (trade name: SKS-293F/Arakawa Chemicals Co., Ltd.) and 0.5 parts of aluminum sulfate were added, respectively. The slurry was then passed through an on-top paper machine to obtain a paper web. The antifoaming agent (trade name: SN defoamer 777/SUNNOPCE Ltd.) of 0.05% to PVA in terms of solid matter and solution of PVA (trade name: PVA-124, saponification degree:98.5 mol %, polymerization degree: 2,400/KURARAY Co. Ltd.), which was prepared to have 6% concentration, was applied to both sides of this paper web by a bar coater and after dried, a base paper to make the coated paper was obtained. The viscosity of the PVA aqueous solution at 20° C. was 450 mPa·s and the coating amount of the PVA solution was 2.8 g/m$^2$ per side surface after the coated material was dried. The basis weight of the base paper thus obtained was 52 g/m$^2$.

[Preparation of Coating Composition]

Slurry of pigment was prepared using Cowless dissolver by means of dispersing the pigments consisting of 15 parts ground calcium carbonate (trade name: FMT-90/Fimatic Corporation), 20 parts precipitated calcium carbonate (trade name: TP-221GS/Okutama Industries Co., Ltd.), 40 parts fine kaolin (trade name: Amazon 86/CADAM Corporation) and 25 parts of a kaolin in general use (trade name: HT/Engelhard Corporation). Next, 10 parts styrene-butadiene copolymer latex as solid matter (trade name: SN307/Sumika A & L Co., Ltd.), 3 parts oxidized starch as solid matter (trade name: ACE A/Oji Corn Starch Co., Ltd.) and other agents were added to the slurry so that the coating composition having the solid matter concentration of 63% was finally prepared.

[Manufacture of the Coated Paper for Printing]

The above mentioned coating composition was applied on both sides of the said base paper by blade coater in an amount of 11 g/m$^2$ per side surface after being dried. The coated paper obtained in this manner was then passed through the super calender comprised of metal rolls and cotton rolls to obtain a coated paper for printing having a density of 1.15 g/cm$^3$. The thermal shrinkage force (R) and evaluation of the fluting in web-offset printing of the coated paper thus obtained are shown in Table 1:

TABLE 1

| | | | Air permeability (air resistance) of the coated paper | | Air resistance of | |
|---|---|---|---|---|---|---|
| | Thermal shrinkage force (gf) | Evaluation of Fluting in web-offset printing | J. Tappi-No. 5 (B) (Sec.) Oken Permeability | Tappi-T536 hm85 High pressure Gurley (Sec.) | the base paper JIS-P-8117 Low pressure Gurley (Sec.) | Mis-registration (mm) |
| Example 1 | 18 | ◎ | 700,000 | 80,000 | 18,000 | 0.24 |
| Example 2 | 22 | ○ | 300,000 | 50,000 | 6,000 | 0.32 |
| Example 3 | 13 | ◎ | 1,500,000 | 250,000 | 60,000 | 0.18 |
| Example 4 | 21 | ○ | 600,000 | 70,000 | 15,000 | 0.30 |
| Example 5 | 41 | Δ | 80,000 | 15,000 | 2,500 | 0.40 |
| Example 6 | 14 | ◎ | 650,000 | 76,000 | 15,000 | — |
| Example 7 | 25 | ◎ | 730,000 | 82,000 | 20,000 | — |
| Example 8 | 40 | ○ | 100,000 | 20,000 | 1,100 | — |
| Example 9 | 28 | ◎ | 180,000 | 39,000 | 1,800 | — |
| Com. Example 1 | 51 | x | 5,000 | 300 | 20 | 0.85 |
| Com. Example 2 | 54 | x | 20,000 | 2,000 | 140 | 0.92 |

[Evaluation Standards]
◎: The generation of fluting in web-offset printing is hardly observed.
○: The generation of fluting in web-offset printing is slightly observed.
Δ: The generation of fluting in web-offset printing is observed.
x: The generation of fluting in web-offset printing is clearly and severly observed.

EXAMPLE 2

Example 1 was repeated to produce a sheet of coated paper except that the coating amount of the PVA solution per side surface after being dried was changed to 1.5 g/m$^2$. The thermal shrinkage force (R) and the evaluation of the fluting in web-offset printing of the coated paper thus obtained are shown in Table 1.

EXAMPLE 3

Example 1 was repeated to produce a sheet of coated paper except that the PVA solution used in Example 1 was replaced by the liquid mixture consisting of 50 parts kaolin (trade name: UW-90/Engelhard Corporation) and 50 parts PVA (trade name: PVA 124/KURARAY Co., Ltd.) having a concentration of 11% solid matter. The thermal shrinkage force (R) and the evaluation of the fluting in web-offset printing of the coated paper thus obtained are shown in Table 1.

EXAMPLE 4

Example 1 was repeated to produce a sheet of coated paper except that PVA-124 used in Example 1 was replaced by PVA (trade name: PVA-224, saponification degree: 88 mol %, polymerization degree: 2,400/KURARAY Co., Ltd.). The thermal shrinkage force (R) and the evaluation of the fluting in web-offset printing of the coated paper thus obtained are shown in Table 1.

COMPARATIVE EXAMPLE 1

Example 1 was repeated to produce a sheet of coated paper except that no size press was used. The thermal shrinkage force (R) and the evaluation of the fluting in web-offset printing of the coated paper thus obtained are shown in Table 1.

COMPARATIVE EXAMPLE 2

Example 1 was repeated to produce a sheet of coated paper except that the size press solution used in Example 1 was replaced with an oxidized starch (trade name: Ace A/Oji Corn Starch Co., Ltd.) having the concentration of 10. The thermal shrinkage force (R) and the evaluation of the fluting in web-offset printing of the coated paper thus obtained are shown in Table 1.

EXAMPLE 5

Example 1 was repeated to produce a sheet of coated paper except that the coating amount of the PVA solution per side surface after being dried was changed to 0.5 g/m$^2$. The thermal shrinkage force (R) and the evaluation of the fluting in web-offset printing or the coated paper thus obtained are shown in Table 1.

Figure 2:
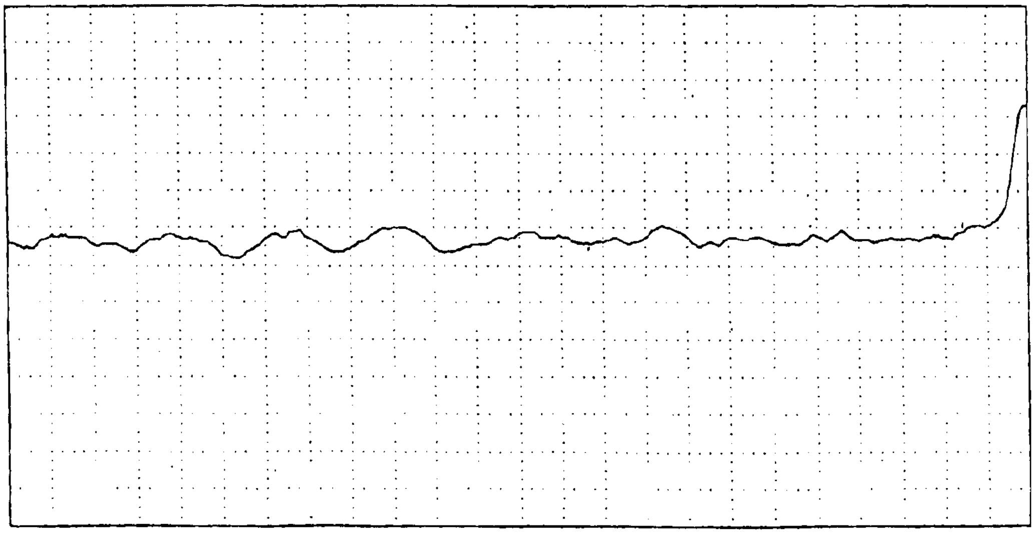
FIG. 2 is a graph of the fluting in web-offset printing of the coated paper which corresponds to the example 2 of the present invention.
Figure 3:
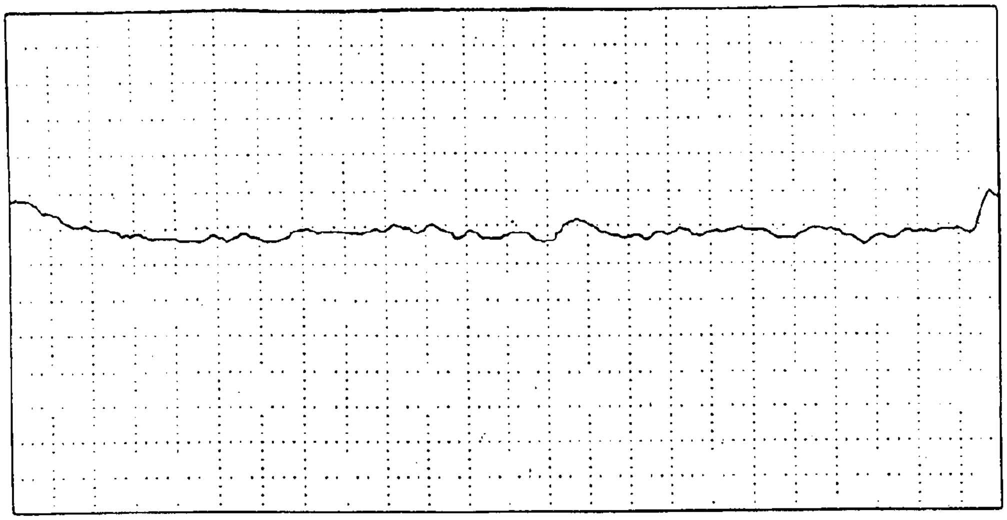
FIG. 3 is a graph of the fluting in web-offset printing of the coated paper which corresponds to the example 3 of the present invention.
Figure 4:
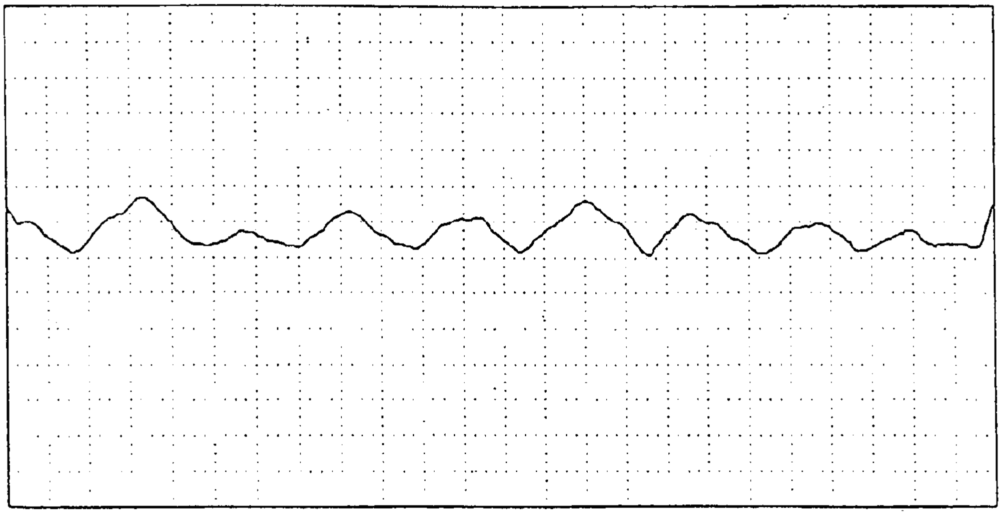
FIG. 4 is a graph of the fluting in web-offset printing of the coated paper which obtained in the comparative example 1.
Figure 5:
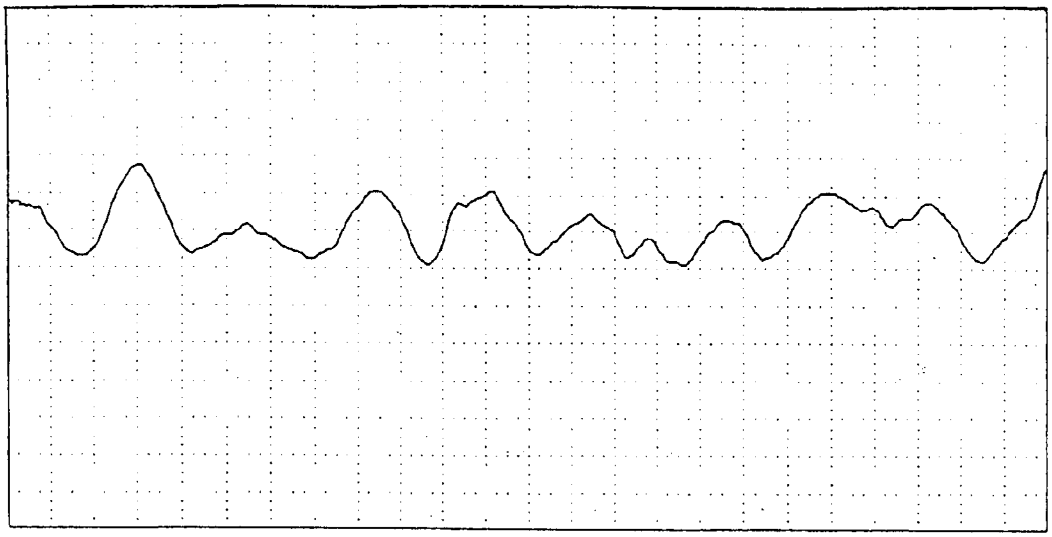
FIG. 5 is a graph of the fluting in web-offset printing of the coated paper which obtained in the comparative example 2 and, as described above, a scale expresses 200 μm in the longitudinal direction and 6.9 mm in the lateral direction, respectively, in the graphs.

After web-offset printing, the surfaces of the coated paper obtained in accordance with the above mentioned Examples 1–3, and Comparative examples 1–2 were made into graphs by using the visible light laser type displacement sensor and waveform observation software. As apparent from FIGS. 1–3, the fluting in web-offset printing is negligible in Examples 1–3. On the other hand, apparent from FIGS. 4 and 5 which show the evaluation results of Comparative examples 1 and 2, considerably severe fluting in web-offset printing was confirmed.

In addition, the coated papers obtained in accordance with the aforementioned Examples 1–5 and Comparative examples 1–2 were now used for gravure rotary printing. The measurement results of the mis-registration were shown in the rightmost column of Table 1. Namely, the evaluation of mis-registration was made as follows:

[Evaluation of Mis-registration]

Printing was conducted by using a gravure rotary printing machine manufactured by Hitachi Seiko Co., Ltd. The total amount of displacement between yellow (the first color) and black (the fourth color) of the register-marks on the right edge and the left edge, with an interval of 412 mm, was given as mis-registration. Each color was dried with hot air at the fixed temperature of 60° C. and no adjustment for mis-registration such as steam addition was made between the colors.

EXAMPLE 6

Example 1 was repeated to produce a sheet of coated paper except that the basis weight of the base paper was changed to 40 g/m$^2$ by reducing the basis weight of the paper web. The thermal shrinkage force (R) and the evaluation of the fluting in web-offset printing of the coated paper thus obtained are shown in Table 1.

EXAMPLE 7

Example 1 was repeated to produce a sheet of coated paper except that the basis weight of the base paper was changed to 83 g/m$^2$ by increasing the basis weight of the paper web. The thermal shrinkage force (R) and the evaluation of the fluting in web-offset printing of the coated paper thus obtained are shown in Table 1.

EXAMPLE 8

To a pulp slurry consisting of 30 parts LBKP (freeness 410 ml/csf), 50 parts deinked pulp (freeness 200 ml/csf) and 20 parts NBKP (freeness 480 ml/csf), precipitated calcium carbonate was added as a filler to obtain the paper ash of 10%. Then, to the pulp slurry, 0.04 parts AKD sizing agent (trade name: SKS-293F/Arakawa Chemicals Co., Ltd.) and 0.5 parts aluminum sulfate were added, respectively. The slurry was then passed through a Fourdrinier paper machine, and subsequently was size press coated with a solution of oxidized starch glue liquid (concentration: 3.5%, trade name: ACE A/Oji Corn Starch Co., Ltd.) and surface size agent (concentration: 0.1%, trade name: polymalon 1329/ Arakawa Chemicals Co., Ltd.) by a two roll size press coater to obtain a paper web. The coating amount at the size press was 1.2 g/m$^2$ on both surfaces after the coated material was dried. Next, the antifoaming agent (trade name: SN defoamer 777/SUUNPCO Ltd.),0.05% as compared to PVA in terms of solid matter, was added to make gelatinized aqueous solution of PVA (trade name: PVA-110, saponification degree: 98.5 mol %, polymerization degree: 1,000/ KURARAY Co., Ltd.). The PVA solution was then mixed with kaolin (trade name: UW-90/Engelhard Corporation) at a ratio of 50:50 as solid matter to obtain an aqueous liquid concentration of 25%. Thus, the obtained liquid was coated to both sides of the paper web by a gate roll coater and then dried to obtain a base paper for coating. The viscosity of the mixture liquid of PVA (at 20° C.) and kaolin was 1,300 mPa·s when coated and the amount of the coating was 7 g/m$^2$ on both surfaces after it was dried. Namely, the coating amount per side surface was almost same when coated by the gate roll coater. The basis weight of the base paper was 83 g/m$^2$.

The coating composition, prepared in the same method as in Example 1, was applied to both surfaces of the base paper and dried. Then the paper was put through a super calendar process and a coated paper for printing was obtained. The thermal shrinkage force (R) and the evaluation of the fluting in web-offset printing of the coated paper thus obtained are shown in Table 1.

EXAMPLE 9

Example 8 was repeated to produce a sheet of coated paper except that the solution composed of oxidized starch glue liquid and surface size agent applied by the two roll size press coater in Example 8 was replaced by the solution of PVA (trade name: PVA-110/KURARAY Co., Ltd.) containing the antifoaming agent (trade name: SN defoamer 777) of 0.05% (as compared to PVA in terms of solid matter) and having a concentration of 3.5%. The thermal shrinkage force (R) and the evaluation of the fluting in web-offset printing of the coated paper thus obtained are shown in Table 1.

As clearly shown in the measurement results in Table 1, the coated paper for printing according to the present invention generates negligible fluting in web-offset printing and is excellent for high quality printing. In addition to this, because mis-registration rarely occurs, she aforementioned coated paper can also be used for gravure rotary printing with the equivalent standards of high quality printing.

What is claimed is:

1. A coated paper for printing comprising a base paper and a coated layer applied to each side of said base paper, said coated layer comprising an adhesive and a pigment;

wherein said base paper is a paper web coated on each side with a polyvinyl alcohol coating, said polyvinyl alcohol coating comprising polyvinyl alcohol;

and wherein the coated paper has a thermal shrinkage force (R) which satisfies the following formula (I):

$$0 \leqq R \leqq 45 \text{ gf}, \quad \text{(I)},$$

wherein the thermal shrinkage force (R) is measured by a method comprising:

adjusting a moisture content of a coated paper sample according to JIS-P-8111 at a temperature of 200° C. and relative humidity of 65%, cutting the coated paper sample to a 2 mm width and a length of 2 cm, setting the coated paper sample in a thermo-mechanical analyzer TMA/SS6000 of Seiko Electronics industries Co., Ltd., with PID control values of a terminal probe at the thermo-mechanical analyzer, proportion (P)=100, integration (I)=1 and differential (D)=100, expanding the coated paper sample at a rate of 0.01 μm/min under an initial load of 5 gf, raising the temperature from 20° C. at a heating speed of 200° C./min to a predetermined temperature of 300° C. for 2 minutes, and reading the shrinkage force generated by thermal drying at 1.5 minutes after commencement of the raising of the temperature to obtain said thermal shrinkage force (R).

2. A coated paper for printing as defined in claim 1, wherein the coated paper has an air resistance of 80,000 seconds or higher when measured according to J. TAPPI Pulp & Paper Testing Method No. 5 (B).

3. A coated paper for printing comprising a base paper and a coated layer applied to each side of said base paper, said coated layer comprising an adhesive and a pigment;

wherein said base paper is a paper web coated on each side with a polyvinyl alcohol coating, said polyvinyl alcohol coating comprising polyvinyl alcohol;

and wherein the coated paper has a thermal shrinkage force (R) which satisfies the following formula (I):

$$0 \leqq R \leqq 45 \text{ gf}, \quad \text{(I)},$$

wherein the thermal shrinkage force (R) is measured by a method comprising:

adjusting a moisture content of a coated paper sample according to JIS-P-8111 at a temperature of 20° C. and relative humidity of 65%, cutting the coated paper sample to a 2 mm width and a length of 2 cm, setting the coated paper sample in a thermo-mechanical analyzer TMA/SS6000 of Seiko Electronics Industries Co., Ltd., with PID control values of a terminal probe at the thermo-mechanical analyzer, proportion (P)=100, integration (I)=1 and differential (D)=100, expanding the coated paper sample at a rate of 0.01 μm/min under an initial load of 5 gf, raising the temperature from 20° C. at a heating speed of 200° C./min to a predetermined temperature of 300° C. for 2 minutes, and reading the shrinkage force generated by thermal drying at 1.5 minutes after commencement of the raising of the temperature to obtain said thermal shrinkage force (R); and wherein the coated paper has an air resistance of 80,000 seconds or higher when measured according to J. TAPPI Pulp & Paper Testing Method No.5 (B).

4. A coated paper comprising a paper web, polyvinyl alcohol coatings applied to both sides of said paper web and respective coated layers applied to said polyvinyl alcohol coatings on both sides of said paper web;

wherein each of said coated layers comprises an adhesive and a pigment;

wherein the coated paper has a thermal shrinkage force (R) which satisfies the following formula (I):

$$0 \leqq R \leqq 45 \text{ gf}, \qquad \text{(I)},$$

wherein the thermal shrinkage force (R) is measured by a method comprising:

adjusting a moisture content of a coated paper sample according to JIS-P-8111 at a temperature of 20° C. and relative humidity of 65%, cutting the coated paper sample to a 2 mm width and a length of 2 cm, setting the coated paper sample in a thermo-mechanical analyzer TMA/SS6000 of Seiko Electronics Industries Co., Ltd., with PID control values of a terminal probe at the thermo-mechanical analyzer, proportion (P)=100, integration (I)=1 and differential (D)=100, expanding the coated paper sample at a rate of 0.01 μm/min under an initial load of 5 gf, raising the temperature from 20° C. at a heating speed of 200° C./min to a predetermined temperature of 300° C. for 2 minutes, and reading the shrinkage force generated by thermal drying at 1.5 minutes after commencement of the raising of the temperature to obtain said thermal shrinkage force (R).

5. The coated paper as defined in claim 4, wherein the coated paper has an air resistance of 80,000 seconds or higher when measured according to J. TAPPI Pulp & Paper Testing Method No. 5 (B).

* * * * *